United States Patent [19]

Mentus

[11] Patent Number: 5,360,162

[45] Date of Patent: Nov. 1, 1994

[54] METHOD AND COMPOSITION FOR PRECIPITATION OF ATMOSPHERIC WATER

[75] Inventor: Slavko Mentus, Belgrade, Yugoslavia

[73] Assignee: Alberta Ltd., Okotoks, Canada

[21] Appl. No.: 893,284

[22] Filed: Jun. 4, 1992

[30] Foreign Application Priority Data

Jun. 11, 1991 [YU] Yugoslavia ................ P-1034/91

[51] Int. Cl.$^5$ .................. B01D 17/00; C06D 3/00; C09K 3/30; E01H 13/00
[52] U.S. Cl. ............................ 239/2.1; 102/334; 102/367; 149/117; 252/305; 252/319
[58] Field of Search ............ 102/334, 367; 149/117; 252/305, 319; 239/2.1, 2.2

[56] References Cited

U.S. PATENT DOCUMENTS

| | | | |
|---|---|---|---|
| 3,274,035 | 9/1966 | Burkardt et al. | 149/117 X |
| 3,545,677 | 12/1970 | Power et al. | 239/2.1 |
| 3,630,950 | 12/1971 | Papee et al. | 252/319 X |
| 3,677,840 | 7/1972 | Shaw et al. | 149/117 X |
| 3,698,968 | 10/1972 | Johnson et al. | 149/117 X |
| 3,769,107 | 10/1973 | Johnson et al. | 149/117 X |
| 3,877,642 | 4/1975 | Vonnegut et al. | 239/2.1 |
| 3,915,379 | 10/1975 | Burkhardt et al. | 239/2 |
| 4,096,005 | 6/1978 | Slusher | 149/117 X |

FOREIGN PATENT DOCUMENTS 0193207 3/1967 U.S.S.R. ................ 239/2.1

OTHER PUBLICATIONS

Paul J. DeMott, William G. Finnegan and Lewis O. Grant An Application of Chemical Kinetic Theory and Methodology to Characterize the Ice Nucleating Properties of Aerosols Used for Weather Modification, 16 Apr. 1983, Journal of Climate and Applied Meteorology, pp. 1190–1203.

*Primary Examiner*—Richard D. Lovering
*Attorney, Agent, or Firm*—Ralph F. Crandell

[57] ABSTRACT

A method for precipitating atmospheric water by means of multicomponent aerosols, including iodide based complex multicomponent aerosol compositions. The compositions comprise a solid mass formed by a compacted mixture of silver iodide and the iodides, iodates, and periodates of alkali metals, lead, copper, barium; ammonia, barium chromate, and selected oxidizers such as ammonium perchlorate, and fuels such as poly-p-phenylene, phenol formaldehyde resin, epoxide resin, and shellac and mixtures thereof. The compositions, upon burning, produce an aerosol effective to promote atmospheric water precipitation.

6 Claims, No Drawings

METHOD AND COMPOSITION FOR PRECIPITATION OF ATMOSPHERIC WATER

BACKGROUND OF THE INVENTION

1. Field of the Invention.

The present invention relates to a process for weather control or modification and aerosol compositions useful therein. More specifically, the present invention relates to an improved method and compositions for the precipitation of atmospheric water by means of multicomponent aerosols.

2. Prior Art.

In both the patent and scientific literature, a number of weather modification methods have been reported, consisting in the seeding of moist atmosphere by aerosols of different chemical composition, both organic and inorganic. The purpose of the seeding is hail suppression, rain regulation or fog precipitation.

In general, aerosols act as active centers of heterogeneous nucleation of atmospheric water, causing a local drop in water vapor pressure around them, which leads to a continuous growth of water droplets or ice crystals. The number of active centers of nucleation developed by dispersion of a nucleant mass unit is used as a measure of its weather modification effectiveness.

The highest known effectiveness has been achieved by the use of silver iodide as a nucleant. Although silver iodide is a rather expensive chemical, if the total costs of dispersion into atmosphere of different nucleants are compared, the weather modification by silver iodide appears to be the most economical.

For weather modification purposes, silver iodide aerosol is developed by burning liquid solutions or solid pyrotechnical mixtures having silver iodide as a constituent. The mixtures generating pure silver iodide aerosol are generally much less effective than those generating composite aerosols.

Pure silver iodide aerosol is practically ineffective above $-5°$ C. Burkhardt, et al. (U.S. Pat. No. 3,915,379) have reported that two-component aerosols of the composition AgI-MI, where M is an alkali metal, show markedly more pronounced nucleation ability than that of pure silver iodide. DeMott, et al. (P.J. DeMott, W.G. Finnegan and L.O. Grant, J. Clim. Appl. Met., 22 (1983) 1190) have shown that the effectiveness of an aerosol developed by burning an acetone solution is considerably improved when the solution contains additives which result in an aerosol which is a mixture AgI, AgCl, and NaCl. However, the improvement was realized only at temperatures below $-10°$ C., while at $-5°$ C., the aerosol is practically ineffective.

Solid pyrotechnic mixtures based on silver iodide as reported in patent and other literature, as compared to liquid solutions, generate aerosols of an improved effectiveness in the vicinity of a threshold temperature of $-5°$ C., thus providing a more uniform nucleation ability within the temperature range of interest from the standpoint of weather modification. An additional advantage of solid mixtures is a wider variety of ways of dispersing them into clouds, such as by means of airplanes, rockets, artillery shells and ground-placed generators.

Increasing of the yield of active nuclei per mass unit of silver iodide, the shift of a threshold temperature as near as possible to 0° C., and the adjustment of dispersion methods to meet the requirements of weather modification, is a never ending task in the field of weather modification.

OBJECTS OF THE INVENTION

The principal object of the present invention is to provide an improved method of weather control and modification involving the precipitation of atmospheric water at temperatures below 0° C.

A related object of the present invention is to provide improved compositions for the production of complex multicomponent aerosols finding particular utility for the precipitation of atmospheric water thereby to effect weather control and modification.

SUMMARY OF THE INTENTION

An improved method of precipitating atmospheric water in the temperature zones below 0° C. has been found, comprising the seeding of the atmosphere by a complex aerosol formed by a chemical composition of which can be expressed by the formula $AgI \cdot M'I \cdot M''_iO_jI_k$, where M' is an alkali metal or $NH_4$ group; M'' is lead, copper or barium, or a mixture thereof; and i, j and k are small arbitrary numerals. This aerosol is produced by burning a solid pyrotechnical mixture of a particular chemical composition. The threshold temperature of aerosol is not lower than $-3°$ C., and the nucleation effectiveness in the temperature range $-6°$ C. to $-15°$ C., being rather uniform, amounts to about $10^{14}$ active nuclei per gram of silver iodide.

The fabrication of this pyrotechnical mixture is rather simple, involving only homogenization and pressing powdered ingredients, with the option of wetting them by an organic solvent before or instead of pressing.

DESCRIPTION OF THE PREFERRED EMBODIMENT

The aerosol composition utilized in the method of atmospheric water precipitation embodying the present invention is a solid pyrotechnical mixture containing the following ingredients, or groups of ingredients, in the form of powders or particles having a diameter below 100 µm:

- silver iodide
- group I additives
- group II additives
- oxidizer
- fuel/binder The group I additives comprises alkali or ammonium iodides, iodates or periodates, or mixtures thereof.

The group II additives comprises iodides, iodates or periodates of lead, copper or barium, or barium chromate, or mixtures thereof.

The preferred oxidizer is ammonium perchlorate; however, the iodates, periodates or chromates also act as oxidizers.

Fuel, which also serves as a binder, is preferably an organic polymer selected from the group poly-p-phenylene, phenolic resin, epoxide resin and shellac.

Examples

Example I

A mixture was made of 14% silver iodide, 25% sodium iodate, 4% barium chromate, 3% copper iodate, 14% poly-p-phenylene and 42% ammonium perchlorate. After homogenization, the mixture was formed into pellets by pressing.

Example II

A mixture made of 1.5% silver iodide, 20% potassium periodate, 5% barium iodate, 4% copper iodide, 4% lead iodide, 16% phenolic resin and 53.5% ammonium perchlorate was homogenized. The mixture was wetted by acetone and placed in air to solidify into a compact piece.

Example III

A mixture of 8% silver iodide, 23% potassium iodate, 3% lead iodate, 4% copper iodide, 15% poly-p-phenylene and 46% ammonium perchlorate was homogenized and pressed into pellets.

Example IV

A mixture as described in Example III, containing shellac instead of poly-p-phenylene was wetted by acetone after homogenization. The acetone evaporated when the mixture was placed in air, and a solid mass of pyrotechnical mixture remained.

Example V

A mixture as described in Example III, contain phenolic resin and uncured epoxy resin in the weight ratio 1:1 instead of poly-p-phenylene was wetted by acetone, homogenized and placed in air. After the acetone evaporated and the epoxide resin was cured, a compact piece of the pyrotechnical mixture remained.

After being ignited, each mixture described in the above Examples burns uniformly, generating an active aerosol. The nucleation ability of each aerosol was examined in an isothermal cloud chamber as a function of temperature. A measurable effectiveness was noted at −3° C. At −6° C., $5\times10^{13}$ to $1\times10^{14}$ active nuclei per one gram of silver iodide was measured, while in the temperature range −6° C. to −15° C., the effectiveness was about $1\times10^{14}$ to $2\times10^{14}$ active nuclei per gram silver iodide. The aerosol is fast-acting, and precipitation of ice crystals in the cloud chamber occurred within two minutes.

It is evident that the complex aerosols show a higher nucleation ability than the simple ones. This fact will be discussed in more detail.

For instance, aerosols AgI-alkali iodides, generated by burning solid pyrotechnical mixtures, as well as aerosols AgI-AgCl -NaCl, generating by burning liquid solutions, are considerably more effective than pure silver iodide aerosol.

By comparing in addition above mentioned two-and three-component aerosols mutually, it can be noted that, in respect to the limit temperature of −8° C., the first ones are superior at higher, and the second ones at lower temperatures.

This invention shows that after addition to the first aerosol of a new component being iodide, oxyiodide or oxide of a heavier metal, its nucleation ability increases for about one order of magnitude. In addition, the superiority range of this aerosol, as compared to the aerosol AgI-AgCl-NaCl, extends to below −10° C.

A superior effectiveness of multicomponent aerosols over that of pure silver iodide is probably due to two following effects:

1. The presence of alkali halogenide makes the multicomponent aerosol hygroscopic. On that basis, the aerosol acts directly on the gas phase, sampling the water molecules and forming the droplets, which are iced by silver iodide. This nucleation mechanism is referred in the scientific literature as a condensation-freezing mechanism. In contrast to that, pure silver iodide aerosol, being rather hydrophobic, acts preferably to collisions with atmospheric water droplets (the contact-freezing nucleation mechanism) which makes its action considerably slower and less effective.

Having in mind that the additional components defined by this invention (iodides, oxyiodides and oxides of heavier metals) are essentially unhygroscopic, their favorable influence on the aerosol effectiveness cannot be ascribed to the hygroscopicity effects.

2. In the solid electrolyte electrochemistry it is known that the systems AgI-alkali iodides with the mole ratio about 4:1, belong to the group of superionic conductors. Their crystallographic structure is considered to be an "averaged" one because of a high mobility of silver cations. This behavior probably means an increased statistical weight of that crystallographic structure favors the formation of ice crystal nuclei at its surface. From this point of view, an additional influence in favor of nucleation ability, realized by the additives defined by this invention, could be ascribed to an additional increase in the statistical weight of that crystal structure, thus favoring the ice nuclei formation.

I claim:

1. A multicomponent aerosol composition for promoting atmospheric water precipitation by seeding moist atmospheric air at a temperature below 0° C. comprising a compacted mixture of 14% by weight silver iodide, 25% by weight sodium iodate, 3% by weight copper iodate, 4% by weight barium chromate, 42% by weight ammonium perchlorate and 14% by weight poly-p-phenylene.

2. A multicomponent aerosol composition for promoting atmospheric water precipitation by seeding moist atmospheric air at a temperature below 0° C. comprising a compacted mixture of 1.5% by weight silver iodide, 20% by weight potassium periodate, 5% by weight barium iodate, 4% by weight copper iodide, 4% by weight lead iodide, 53.5% by weight ammonium perchlorate, and 16% by weight phenolic resin.

3. A multicomponent aerosol composition for promoting atmospheric water precipitation by seeding moist atmospheric air at a temperature below 0° C. comprising a compacted mixture of 8% by weight silver iodide, 23% by weight potassium iodate, 3% by weight lead iodate, 4% by weight copper iodide, 46% by weight ammonium perchlorate, and 15% by weight poly-p-phenylene.

4. A method of atmospheric water precipitation comprising seeding the moist atmosphere at a temperature below 0° C. by an aerosol generated by burning a pyrotechnic mixture comprising a compacted mixture of 14% by weight silver iodide; 25% by weight sodium iodate, 3% by weight copper iodate, 4% by weight barium chromate, 42% by weight ammonium perchlorate and 14% by weight poly-p-phenylene.

5. A method of atmospheric water precipitation comprising seeding the moist atmosphere at a temperature below 0° C. by an aerosol generated by burning a pyrotechnic mixture comprising a compacted mixture of 1.5% by weight silver iodide, 20% by weight potassium periodate, 5% by weight barium iodate, 4% by weight copper iodide, 4% by weight lead iodide, 53.5% by weight ammonium perchlorate, and 16% by weight phenolic resin.

6. A method of atmospheric water precipitation comprising seeding the moist atmosphere at a temperature below 0° C. by an aerosol generated by burning a pyrotechnic mixture comprising a compacted mixture of 8% by weight silver iodide, 23% by weight potassium iodate, 3% by weight lad iodate, 4% by weight copper iodide, 46% by weight ammonium perchlorate, and 15% by weight poly-p-phenylene.

* * * * *

UNITED STATES PATENT AND TRADEMARK OFFICE
CERTIFICATE OF CORRECTION

PATENT NO.   : 5,360,162
DATED        : November 1, 1994
INVENTOR(S)  : Mentus

It is certified that error appears in the above-identified patent and that said Letters Patent is hereby corrected as shown below:

On the title page, item[73] delete "Alberta Ltd" and insert -- 359969 Alberta Ltd --

Signed and Sealed this

Seventeenth Day of October, 2000

*Attest:*

Q. TODD DICKINSON

*Attesting Officer*   *Director of Patents and Trademarks*